(12) United States Patent
Viveney et al.

(10) Patent No.: US 11,599,274 B2
(45) Date of Patent: Mar. 7, 2023

(54) SYSTEM AND METHOD FOR VALIDATING ACTIONS TO BE PERFORMED ON A STORAGE SYSTEM OBJECTS

(71) Applicant: EMC IP Holding Company, LLC, Hopkinton, MA (US)

(72) Inventors: Robert A. Viveney, Brookline, NH (US); Carole Ann Gelotti, Hollis, NH (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 9 days.

(21) Appl. No.: 17/231,348

(22) Filed: Apr. 15, 2021

(65) Prior Publication Data

US 2022/0334729 A1 Oct. 20, 2022

(51) Int. Cl.
*G06F 3/06* (2006.01)
*G06F 11/07* (2006.01)

(52) U.S. Cl.
CPC ............ *G06F 3/0619* (2013.01); *G06F 3/062* (2013.01); *G06F 3/067* (2013.01); *G06F 3/0653* (2013.01); *G06F 3/0659* (2013.01); *G06F 11/0772* (2013.01)

(58) Field of Classification Search
CPC ...... G06F 3/0619; G06F 3/062; G06F 3/0653; G06F 3/0659; G06F 3/067; G06F 11/0772
See application file for complete search history.

(56) References Cited

U.S. PATENT DOCUMENTS 5,692,125 A * 11/1997 Schloss .............. G06Q 10/1093
705/7.18
9,218,252 B1 * 12/2015 Revur .................. G06F 11/1469
2017/0255401 A1 * 9/2017 Basham .................. G06F 3/067

OTHER PUBLICATIONS

Srinivas, Harshavardhan, et al. "Content Level Access Control for Object Storage Systems." (2018). (Year: 2018).*
Gibson, Garth A., et al. "A cost-effective, high-bandwidth storage architecture." ACM SIGOPS operating systems review 32.5 (1998): 92-103. (Year: 1998).*

* cited by examiner

*Primary Examiner* — Nicholas J Simonetti
(74) *Attorney, Agent, or Firm* — Brian J. Colandreo; Mark H. Whittenberger; Holland & Knight LLP (57) ABSTRACT

A method, computer program product, and computing system for receiving a request to perform an action on an object within a storage system and may determine whether the action is valid for performing on the object based upon, at least in part, one or more conditions associated with performing the action and one or more parameters of a validation annotation associated with the one or more conditions. In response to determining that the action is valid, the action may be performed on the object. In response to determining that the action is invalid, one or more errors may be generated based upon, at least in part, the one or more parameters of the validation annotation associated with the one or more conditions.

20 Claims, 6 Drawing Sheets

```
500    @ActionBlocker( errorCode = VOLUME_IMPORT_IN_PROGRESS,   504
           actionsToBypass = { ResourceActionEnum.ATTACH_VALUE,
502                             ResourceActionEnum.MODIFY_VALUE} )
       public Boolean getIsImporting() {
           return isImporting;
       }
```

FIG. 5A

```
500    @ActionBlocker( errorCode = VOLUME_MIGRATION_IN_PROGRESS,   508
           actionsToBypass = { ResourceActionEnum.SNAPSHOT_VALUE },
           canBeForced = true   514
506    )
       public Boolean getIsMigrating() {
           return migrationSessionId != null & !migrationSessionId.isEmpty();
       }
```

FIG. 5B

```
500    @ActionBlocker( errorCode = VOLUME_NAME_LENGTH_EXCEEDED,   512
           onlyActionsToProcess = { ResourceActionEnum.CREATE_VALUE,
                                    ResourceActionEnum.CLONE_VALUE,
510                                 ResourceActionEnum.MODIFY_VOLUME } )
       private Boolean getIsVolumeNameLengthExceeded() {
           String name = volumeName;
           if (emptyString(name)) return false;

Boolean exceeded name.codePointCount(0, name.length()) > LUN_MAX_NAME_LENGTH;
           if (exceeded) {
               addExtraArgumentToMessage(name);
               addExtraArgumentToMessage(LUN_MAX_NAME_LENGTH);
           }
           return exceeded;
       }
```

SYSTEM AND METHOD FOR VALIDATING ACTIONS TO BE PERFORMED ON A STORAGE SYSTEM OBJECTS

BACKGROUND

Storing and safeguarding electronic content may be beneficial in modern business and elsewhere. Accordingly, various methodologies may be employed to protect and distribute such electronic content.

When interacting with objects of a storage system, certain actions may be permitted and other actions may be blocked. Conventional processing of actions include complicated validation state machines with many compounding conditions or states. Over time, as new requirements arise, validation processing may incur a performance penalty and may become difficult to manage in a storage system code base since sharing of states for different action requests have different criteria for what actions are allowed. In these conventional techniques, the order of the placement of the validation states may also be important and add to the level of complexity and cost of implementation. In addition, the conventional processing of the validation conditions results in an immediate exit from the state machine without evaluating other potential blocking conditions so multiple blocking conditions are only identified one at a time. This results in frustration for the requester making multiple requests to identify all validation errors.

Furthermore, it is difficult to correlate the actions and blocking conditions in the code base and to share validation checks at the same time since the procedural implementation results in lots of conditionals and code bloat. Adding to and/or modifying the monolithic validation state of conventional validation state machines may become more precarious as more requirements are implemented.

SUMMARY OF DISCLOSURE

In one example implementation, a computer-implemented method executed on a computing device may include, but is not limited to, receiving a request to perform an action on an object within a storage system and may determine whether the action is valid for performing on the object based upon, at least in part, one or more conditions associated with performing the action and one or more parameters of a validation annotation associated with the one or more conditions. In response to determining that the action is valid, the action may be performed on the object. In response to determining that the action is invalid, one or more errors may be generated based upon, at least in part, the one or more parameters of the validation annotation associated with the one or more conditions.

One or more of the following example features may be included. The one or more parameters of the validation annotation may define one or more errors associated with the plurality of conditions. Generating one or more errors based upon, at least in part, the one or more parameters of the validation annotation associated with the one or more conditions may include generating an error for each condition for which the action is not valid based upon, at least in part, the one or more parameters of the validation annotation associated with the one or more conditions; and providing each error to a requesting computing device. The one or more parameters of the validation annotation may define one or more actions that bypass at least one condition of the one or more conditions. The one or more parameters of the validation annotation may define an exclusive list of actions that are valid for performing on the object. The one or more parameters of the validation annotation may define one or more errors configured to be overridden. An override flag associated with the one or more errors configured to be overridden may be received in the request to perform the action on the object.

In another example implementation, a computer program product resides on a computer readable medium that has a plurality of instructions stored on it. When executed by a processor, the instructions cause the processor to perform operations that may include, but are not limited to, receiving a request to perform an action on an object within a storage system and may determine whether the action is valid for performing on the object based upon, at least in part, one or more conditions associated with performing the action and one or more parameters of a validation annotation associated with the one or more conditions. In response to determining that the action is valid, the action may be performed on the object. In response to determining that the action is invalid, one or more errors may be generated based upon, at least in part, the one or more parameters of the validation annotation associated with the one or more conditions.

One or more of the following example features may be included. The one or more parameters of the validation annotation may define one or more errors associated with the plurality of conditions. Generating one or more errors based upon, at least in part, the one or more parameters of the validation annotation associated with the one or more conditions may include generating an error for each condition for which the action is not valid based upon, at least in part, the one or more parameters of the validation annotation associated with the one or more conditions; and providing each error to a requesting computing device. The one or more parameters of the validation annotation may define one or more actions that bypass at least one condition of the one or more conditions. The one or more parameters of the validation annotation may define an exclusive list of actions that are valid for performing on the object. The one or more parameters of the validation annotation may define one or more errors configured to be overridden. An override flag associated with the one or more errors configured to be overridden may be received in the request to perform the action on the object.

In another example implementation, a computing system includes at least one processor and at least one memory architecture coupled with the at least one processor, wherein the at least one processor is configured to receive a request to perform an action on an object within a storage system. The at least one processor is further configured to determine whether the action is valid for performing on the object based upon, at least in part, a plurality of conditions associated with performing the action and a plurality of validation annotations for the plurality of conditions. The at least one processor is further configured to, in response to determining that the action is valid, performing the action on the object, and wherein the processor is further configured to, in response to determining that the action is invalid, generate one or more errors based upon, at least in part, the plurality of validation annotations for the plurality of conditions.

One or more of the following example features may be included. The one or more parameters of the validation annotation may define one or more errors associated with the plurality of conditions. Generating one or more errors based upon, at least in part, the one or more parameters of the validation annotation associated with the one or more conditions may include generating an error for each condition for which the action is not valid based upon, at least in part, the one or more parameters of the validation annotation associated with the one or more conditions; and providing each error to a requesting computing device. The one or more parameters of the validation annotation may define one or more actions that bypass at least one condition of the one or more conditions. The one or more parameters of the validation annotation may define an exclusive list of actions that are valid for performing on the object. The one or more parameters of the validation annotation may define one or more errors configured to be overridden. An override flag associated with the one or more errors configured to be overridden may be received in the request to perform the action on the object.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

DETAILED DESCRIPTION

Figure 1:
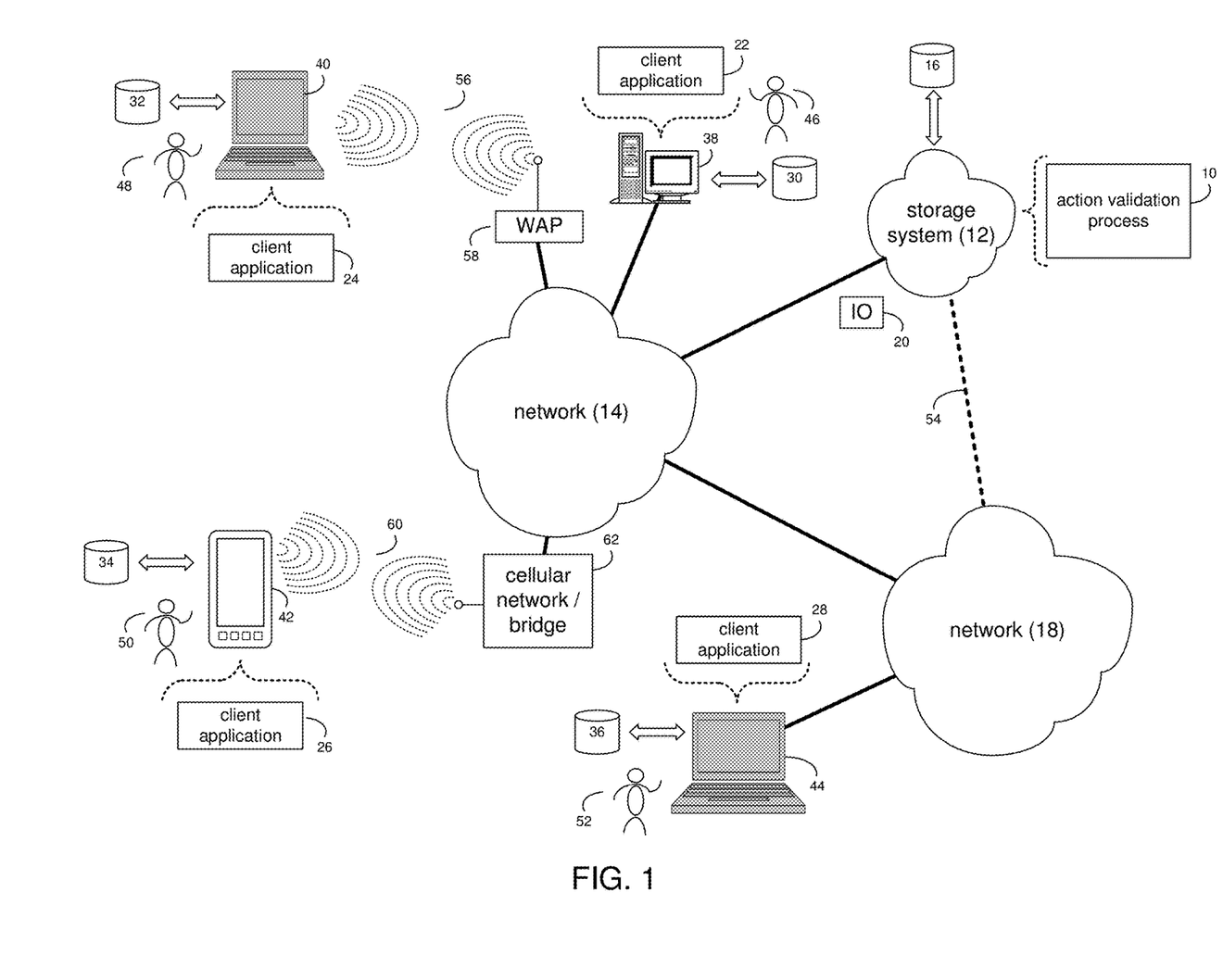
FIG. 1 is an example diagrammatic view of a storage system and an action validation process coupled to a distributed computing network according to one or more example implementations of the disclosure.

System Overview:

Referring to FIG. 1, there is shown action validation process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of action validation process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of action validation process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, an action validation process, such as action validation process 10 of FIG. 1, may include but is not limited to, receiving a request to perform an action on an object within a storage system and may determine whether the action is valid for performing on the object based upon, at least in part, one or more conditions associated with performing the action and one or more parameters of a validation annotation associated with the one or more conditions. In response to determining that the action is valid, the action may be performed on the object. In response to determining that the action is invalid, one or more errors may be generated based upon, at least in part, the one or more parameters of the validation annotation associated with the one or more conditions.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
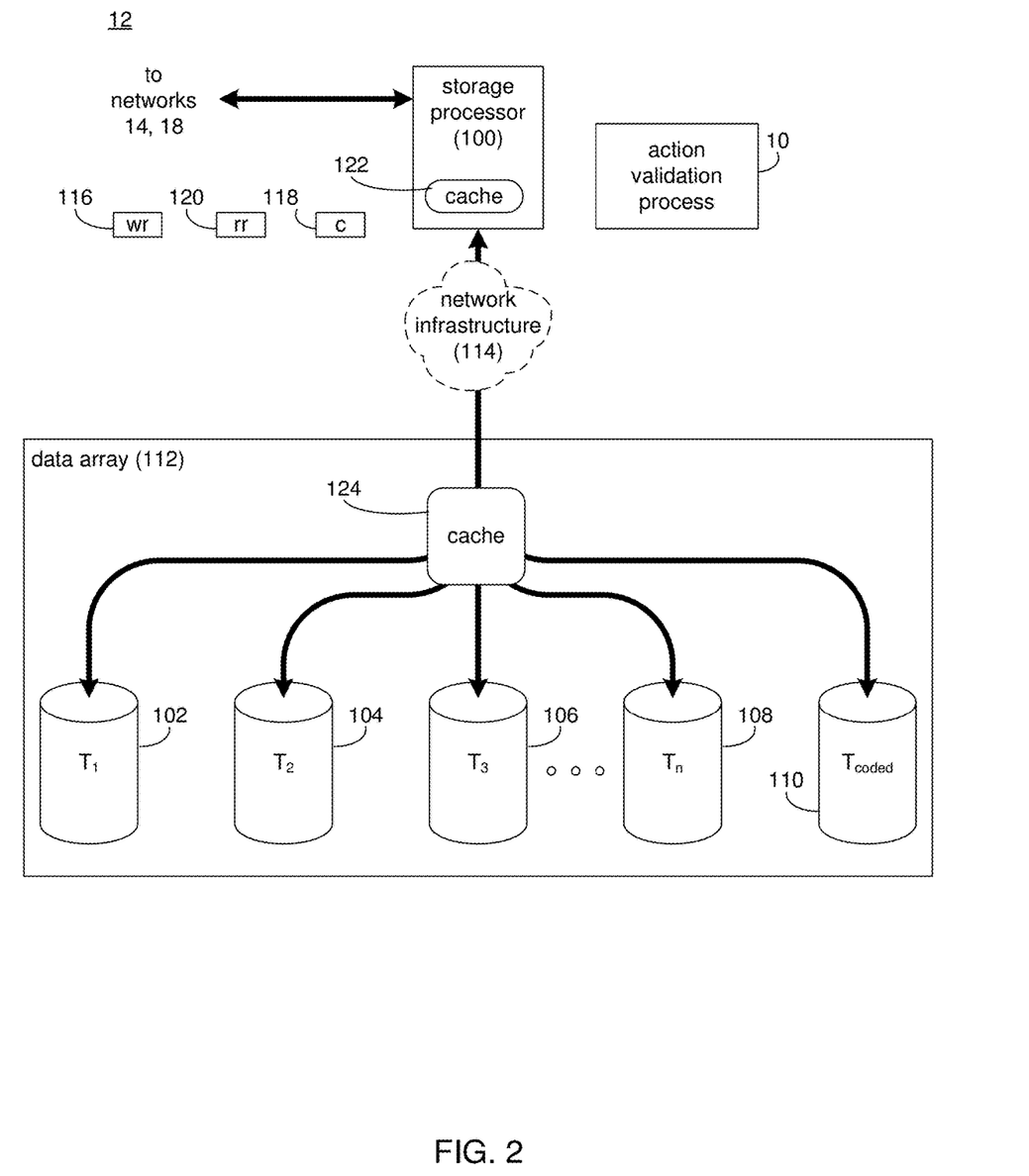
FIG. 2 is an example diagrammatic view of the storage system of FIG. 1 according to one or more example implementations of the disclosure.
Figure 3:
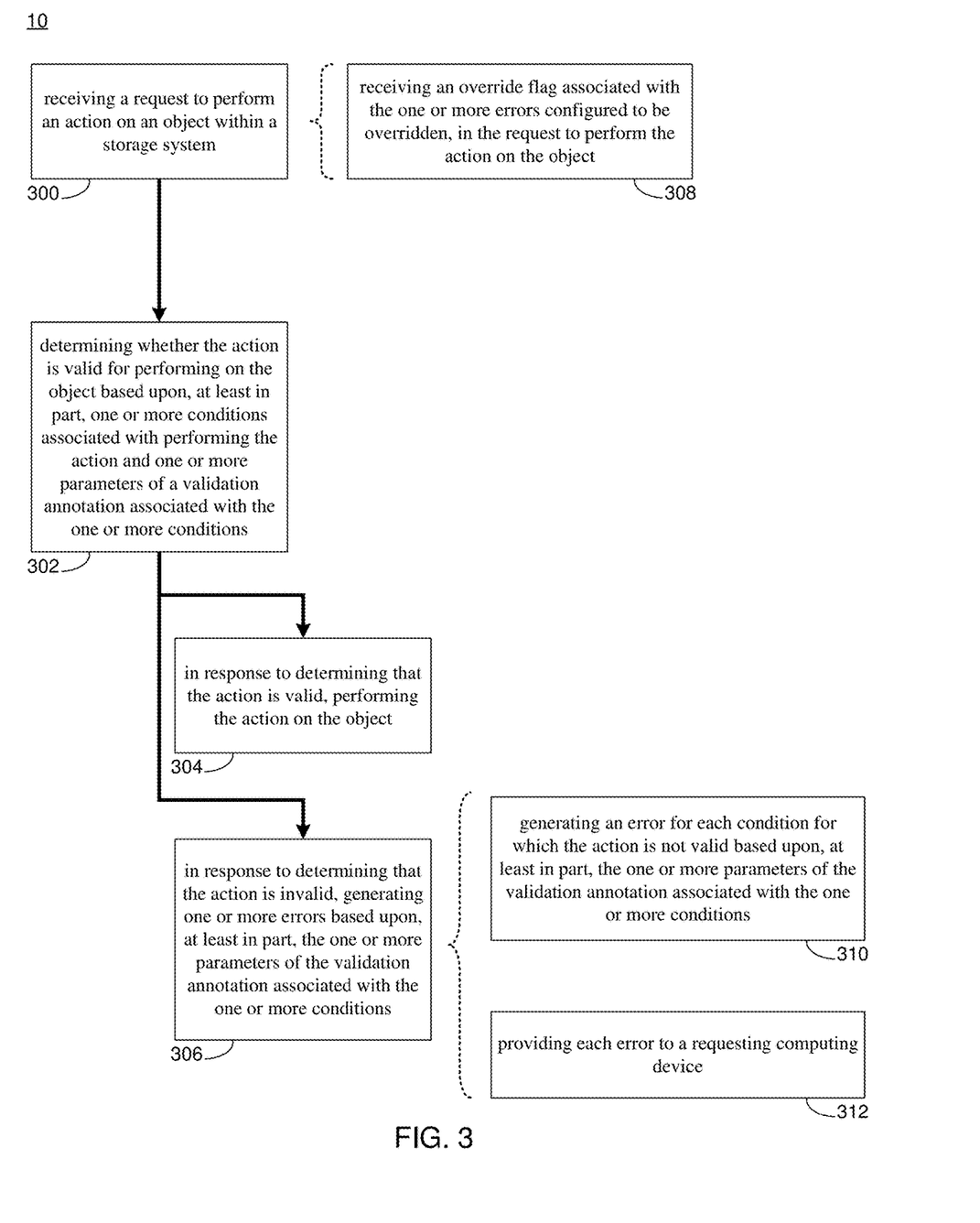
FIG. 3 is an example flowchart of action validation process according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of action validation process 10. The instruction sets and subroutines of action validation process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of action validation process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of action validation process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of action validation process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

The Action Validation Process:

Referring also to the examples of FIGS. 3-6 and in some implementations, action validation process 10 may receive 300 a request to perform an action on an object within a storage system and may determine 302 whether the action is valid for performing on the object based upon, at least in part, one or more conditions associated with performing the action and one or more parameters of a validation annotation associated with the one or more conditions. In response to determining that the action is valid, the action may be performed 304 on the object. In response to determining that the action is invalid, one or more errors may be generated 306 based upon, at least in part, the one or more parameters of the validation annotation associated with the one or more conditions.

As will be discussed in greater detail below, implementations of the present disclosure may allow for a single validation state when processing requests to perform actions on objects of a storage system. When interacting with objects of a storage system, certain actions may be permitted and other actions may be blocked. Conventional processing of actions include complicated validation state machines with many compounding conditions or states. Over time, as new requirements arise, validation processing may incur a performance penalty and may become difficult to manage in a storage system code base since sharing of states for different action requests have different criteria for what actions are allowed. In these conventional techniques, the order of the placement of the validation states may also be important and add to the level of complexity and cost of implementation. In addition, the conventional processing of the validation conditions results in an immediate exit from the state machine without evaluating other potential blocking conditions so multiple blocking conditions are only identified one at a time. This results in frustration for the requester making multiple requests to identify all validation errors.

Furthermore, it is difficult to correlate the actions and blocking conditions in the code base and to share validation checks at the same time since the procedural implementation results in lots of conditionals and code bloat. Adding to and/or modifying the monolithic validation state of conventional validation state machines may become more precarious as more requirements are implemented.

Accordingly, implementations of the present disclosure may avoid these issues and allow for improvements in the performance of the storage system when processing requests to perform actions on storage system objects by defining a common validation annotation with one or more configurable parameters associated with particular conditions. In this manner, conventional validation state machines can be reduced to one validation state that evaluates each of the validations for a particular action. A list of error codes can be returned to represent all failed validations.

Figure 4:
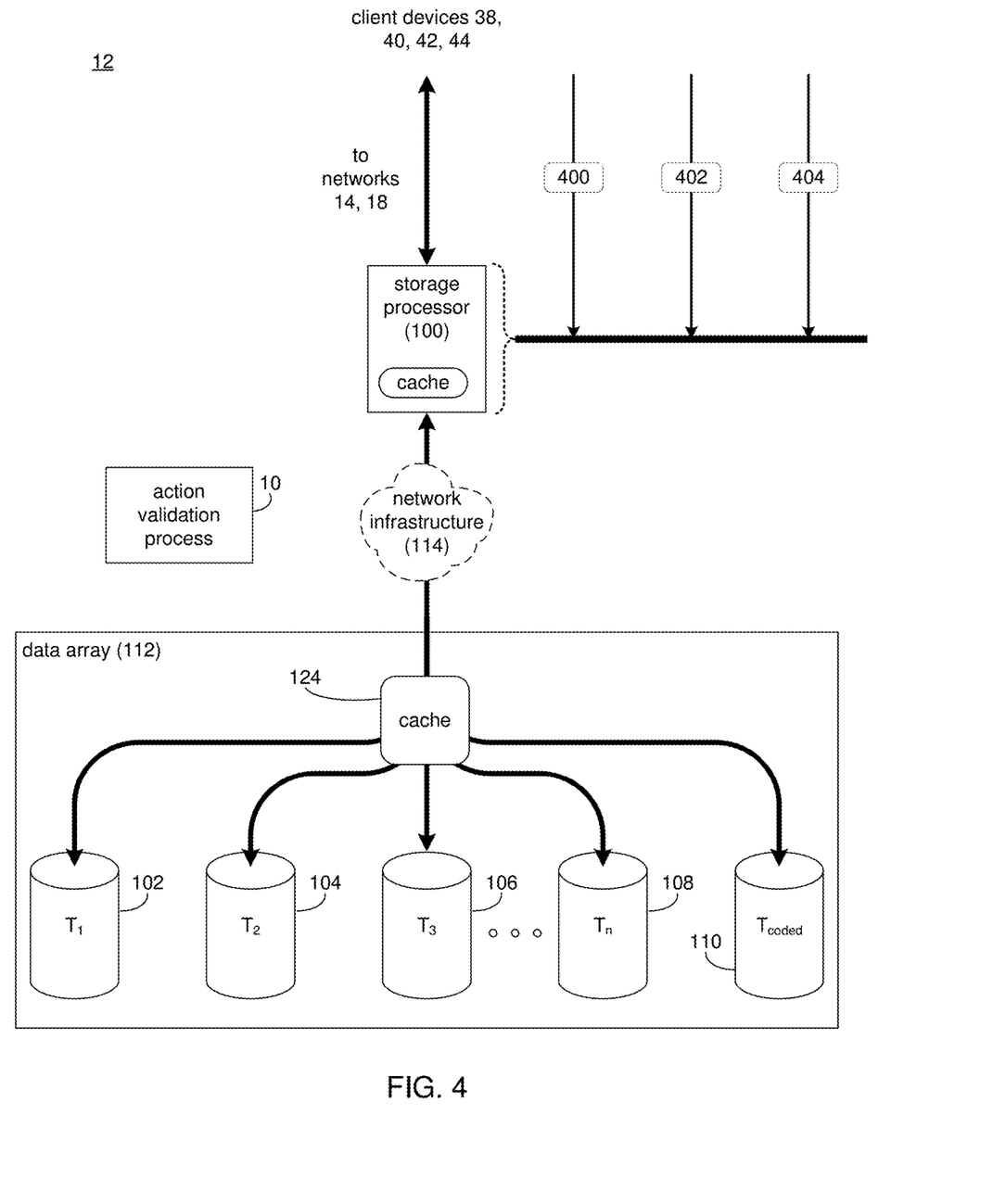
FIG. 4 is an example diagrammatic view of the storage system of FIG. 1 according to one or more example implementations of the disclosure.

In some implementations, action validation process 10 may receive 300 a request to perform an action on an object within a storage system. An object within a storage system may generally include a physical or virtual attribute of a logical storage entity. For example, objects may include storage volumes, LUNs, file systems, etc. An action may generally include a command or operation to be performed on an object within the storage system. In some implementations, action validation process 10 may receive 300, at a storage system (e.g., storage system 12), a request (e.g., requests 400, 402, 404) to perform an action on an object within a storage system from one or more client electronic devices (e.g., client electronic devices 38, 40, 42, 44). However, it will be appreciated that requests 400, 402, 404 may be received from any computing device within the scope of the present disclosure.

Referring also to FIG. 4 and in some implementations, action validation process 10 may receive 300, at storage processor 100, e.g., three requests (e.g., requests 400, 402, 404) to perform an action on an object within storage system 12. For example purposes only, suppose that request 400 is directed to e.g., deleting an object within storage system 12. Further suppose that request 402 is directed to e.g., creating a snapshot on a source volume during migration of the volume. Finally, suppose that request 404 is directed to e.g., defining a volume name when creating the volume within storage system 12.

In some implementations, action validation process 10 may determine 302 whether the action is valid for performing on the object based upon, at least in part, one or more conditions associated with performing the action and one or more parameters of a validation annotation associated with the one or more conditions. In some implementations, various conditions or predicate functions may be defined to validate an action for performing on an object. For example, storage processor 100 may include validation logic with a plurality of conditions associated with a plurality of actions that may be performed on storage system 12.

Figure 5A:
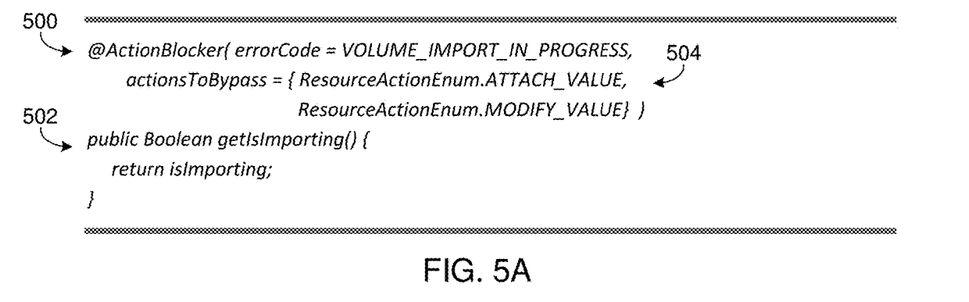
FIGS. 5A-5C are example diagrammatic views of a validation annotation with unique parameters for various conditions according to one or more example implementations of the disclosure.
Figure 5B:
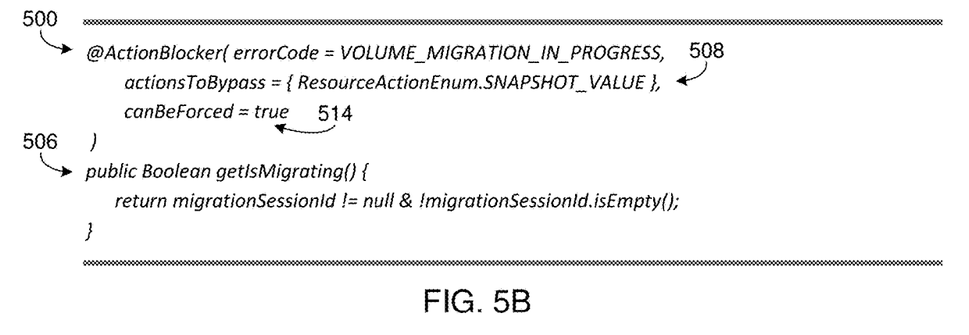
Figure 5C:
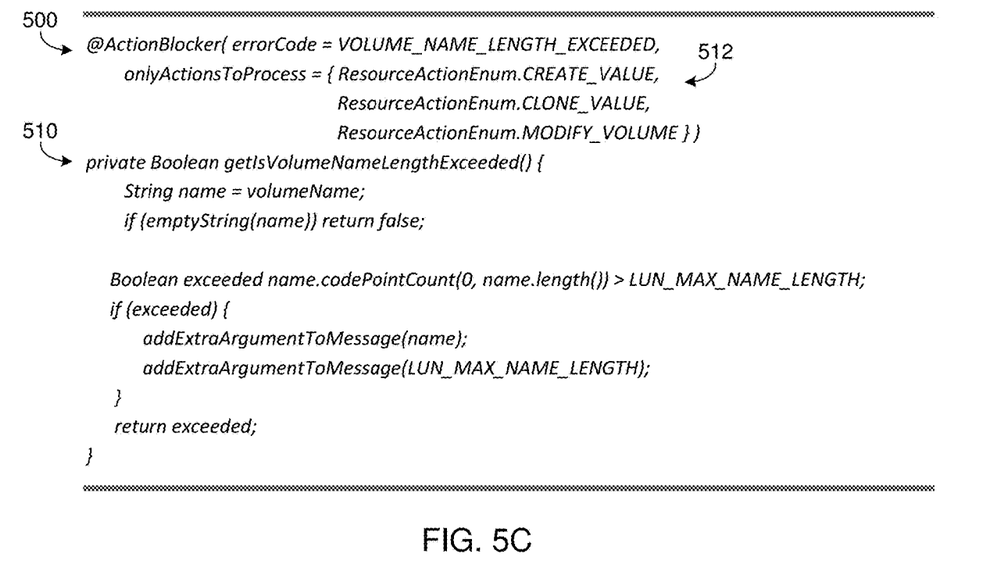

In some implementations, the validation logic may include a common validation annotation with one or more configurable parameters. Referring also to FIGS. 5A-5C and in some implementations, a validation annotation (e.g., validation annotation 500) may generally include an annotation to a condition that is configured to be called by action validation process 10 when validating an action for performing on a storage system object. In the example code segments shown in FIGS. 5A-5C, validation annotation 500 is shown as "@ActionBlocker" followed by one or more parameters. As will be discussed in greater detail below, a common validation annotation (e.g., validation annotation 500) may be created for each condition. In this manner, a single validation state may determine 302 whether the action is valid for performing on the object by processing the common validation annotation associated with one or more conditions and the parameters defined for each condition.

In one example, the validation annotation may be a Java® annotation. As is known in the art, a Java annotation is a form of syntactic metadata that can be added to Java source code where classes, methods, variables, parameters and Java packages may be annotated. While an example of a Java annotation has been described for implementing validation annotation 500, it will be appreciated that this is for example purposes only and that any annotation structure of any programming language may be used for validation annotation 500 within the scope of the present disclosure.

As shown in FIGS. 5A-5C, action validation process 10 may generate or define a validation annotation (e.g., validation annotation 500) which may be added to a predicate function or condition at compile time. The predicate function may evaluate one or more conditions associated with performing an action on an object (e.g., a Boolean value of an object attribute, the length of a string, the capacity of a storage container or volume, etc.). Referring again to FIG. 5A, validation annotation 500 may be added to a function or condition logic configured to determine whether a storage volume is being imported (e.g., condition logic 502). In this example and as will be discussed in greater detail below, validation annotation 500 as shown in FIG. 5A may include one or more parameters (e.g., parameters 504) defined for the one or more conditions (e.g., condition logic 502). In this manner, a call or reference to a common validation annotation (e.g., validation annotation 500) may allow for processing of the one or more conditions annotated by the validation annotation based upon, at least in part, the one or more parameters defined for the one or more conditions.

In some implementations, the one or more parameters of the validation annotation may define one or more errors associated with the plurality of conditions. For example and in some implementations, the one or more parameters may define errors or error codes that may be translated into a user-friendly error message if the action is denied (e.g., determining 302 that the action is invalid for performing on the object). As shown in FIGS. 5A-5C, validation annotation 500 may include parameters that define one or more errors or error codes associated with the plurality of conditions. For example and as shown in FIG. 5A, if a storage volume is being imported when a request to perform an action on the storage volume is received, an error code indicating that the storage volume is being imported may be generated. In another example and as shown in FIG. 5B, if a storage volume is being migrated when a request to perform an action on the storage volume is received, an error code indicating that the storage volume is being migrated may be generated. In another example and as shown in FIG. 5C, if the name assigned (or being assigned) to a storage volume exceeds a predefined threshold or name limit in response to receiving a request to create or modify the name of the storage volume, an error code indicating that the volume name exceeds a permissible length may be generated. While three examples have been provided for one or more parameters that may define one or more errors associated with the plurality of conditions, it will be appreciated that any number of errors and/or types of errors may be defined by the one or more parameters of the validation annotation within the scope of the present disclosure.

In some implementations, the one or more parameters of the validation annotation may define one or more actions that bypass at least one condition of the one or more conditions. For example, action validation process 10 may, via one or more parameters of the validation annotation, provide an override attribute so that particular actions may bypass a specific validation. Referring again to FIG. 5B, validation annotation 500 may be added to a function or condition logic configured to determine whether a storage volume is being migrated (e.g., condition logic 506). In this example, validation annotation 500 as shown in FIG. 5B may include one or more parameters (e.g., parameters 508) defined for the one or more conditions (e.g., condition logic 506). Specifically, parameters 508 may include a parameter defining one or more actions that bypass condition logic 506. In this example, if the action is to e.g., create a snapshot on the source volume while the source volume is being migrated, action validation process 10 may determine 302 that the action is valid and may permit the action to be performed on the source volume (e.g., generating the snapshot of the source volume). While an example of bypassing a condition associated with whether a volume is being migrated when the action includes performing a snapshot of the volume has been described, it will be appreciated that any condition may be bypassed for any type or number of actions within the scope of the present disclosure.

In some implementations, the one or more parameters of the validation annotation may define an exclusive list of actions that are valid for performing on the object. For example, action validation process 10 may, via one or more parameters of the validation annotation, provide a list of the only actions that may be performed on an object (e.g., an exclusive list of actions that are valid for performing on the object). Referring again to FIG. 5C, validation annotation 500 may be added to a function or condition logic configured to determine whether a name assigned to (or being assigned to) a storage volume exceeds a predefined threshold (e.g., condition logic 510).

In this example and as will be discussed in greater detail below, validation annotation 500 as shown in FIG. 5C may include one or more parameters (e.g., parameters 512) defined for the one or more conditions (e.g., condition logic 510). Specifically, parameters 512 may define an exclusive list of e.g., three actions that may be performed on the object. In this example, the need to check the object name exists when creating a volume and volume group; creating a clone and clone volume group; and when modifying a volume. These commands may validate the length of the volume name before allowing the request to be processed. In some implementations, the exclusive list of actions may consolidate validations for multiple actions. For example, conventional approaches for validating the volume name included three separate states (e.g., one for creating a volume and volume group; one for creating a clone and clone volume group; and one for modifying a volume). In this manner, action validation process 10 may improve the functioning of the storage system may reducing the number of validation state machines to execute when determining 302 whether an action is valid for performing on an object. While an example with an exclusive list including three actions for performing has been described, it will be appreciated that the exclusive list of actions may include any type of and/or number of actions within the scope of the present disclosure.

In some implementations, the one or more parameters of the validation annotation may define one or more errors configured to be overridden. For example, one or more parameters may define errors that may be overridden with the use of an override flag in the request. In some implementations, when an override flag is identified, the one or more conditions will not be evaluated. Referring again to FIG. 5B, validation annotation 500 may include one or more parameters (e.g., parameters 508) defined for the one or more conditions (e.g., condition logic 506) which are allowed to be overridden (e.g., override is allowed via parameter 514). In this example, one or more parameters of validation annotation may be defined for one or more errors that may be overridden when an override flag is identified in the request.

In some implementations, action validation process 10 may determine 302 whether the action is valid for performing on the object based upon, at least in part, one or more conditions associated with performing the action and one or more parameters of a validation annotation associated with the one or more conditions. For example, at runtime and in response to receiving 300 a request to perform an action on an object within the storage system, action validation process 10 may, from a single validation state, evaluate one or more conditions or predicate functions associated with the action and that are annotated with the validation annotation.

For example and referring again to FIG. 4, suppose that action validation process 10 receives 300 e.g., three requests (e.g., requests 400, 402, 404) for performing three different actions on objects within storage system 12. In this example, suppose request 400 is directed to e.g., deleting a volume within storage system 12. Referring again to FIG. 5A, action validation process 10 may determine 302 whether the action is valid for performing on the object based upon, at least in part, condition logic 502 that determines whether or not the volume of the request is being imported. In this example, suppose that action validation process 10 determines (e.g., via condition logic 502) that the volume is not being imported when request 400 is received. Accordingly, action validation process 10 may determine 302 that the delete action of request 400 is valid for performing on the volume. While the above example discusses a single condition (e.g., whether or not the volume is being imported), it will be appreciated that any number of and/or combination of annotated conditions (i.e., conditions annotated with validation annotation 500) may be processed within the scope of the present disclosure.

Referring again to FIG. 4, suppose that request 402 is directed to e.g., creating a snapshot on a source volume during migration of the volume. Referring again to FIG. 5B, action validation process 10 may determine 302 whether the action is valid for performing on the object based upon, at least in part, condition logic 506 that determines whether or not the volume of the request is being migrated. In this example, suppose that action validation process 10 determines (e.g., via condition logic 506) that the volume is being migrated when request 402 is received. Action validation process 10 may generally determine 302 that any action would be invalid for performing on the volume being migrated. However, because parameters 508 define a snapshot action or operation as bypassing the migration condition, action validation process 10 may determine 302 that the snapshot action of request 402 is valid for performing on the migrating volume. While the above example discusses a single condition (e.g., whether or not the volume is being migrated), it will be appreciated that any number of and/or combination of annotated conditions (i.e., conditions annotated with validation annotation 500) may be processed within the scope of the present disclosure.

In some implementations, action validation process 10 may receive 308 an override flag associated with the one or more errors configured to be overridden, in the request to perform the action on the object. Continuing with the above example, suppose that request 402 includes an override flag associated with performing an action on the object. As discussed above, further suppose that parameters 508 define that condition logic 506 may be overridden when an override flag is identified. In this example, regardless of whether or not the action of request 402 is defined by parameters 508 as bypassing condition logic 506, action validation process 10 may determine 302 that the action of request 402 is valid for performing on the object because of the override flag received with or within request 402.

Referring again to FIG. 4, suppose that request 404 is directed to e.g., defining a volume name when creating the volume within storage system 12. Referring again to FIG. 5C, action validation process 10 may determine 302 whether the action is valid for performing on the object based upon, at least in part, condition logic 510 that determines whether or not the name of the volume exceeds a predefined length. In this example, because parameters 512 define an exclusive list of actions to process for condition logic 510, action validation process 10 may determine 302 whether or not the volume creation action is valid for performing on the storage system based upon, at least in part, condition logic 510 and parameters 512 of validation annotation 500. In this example, suppose that the volume creation object includes a volume name that exceeds the predefined length. In this example, action validation process 10 may determine that the volume creation of request 404 is invalid for performing on the storage system.

Figure 6:
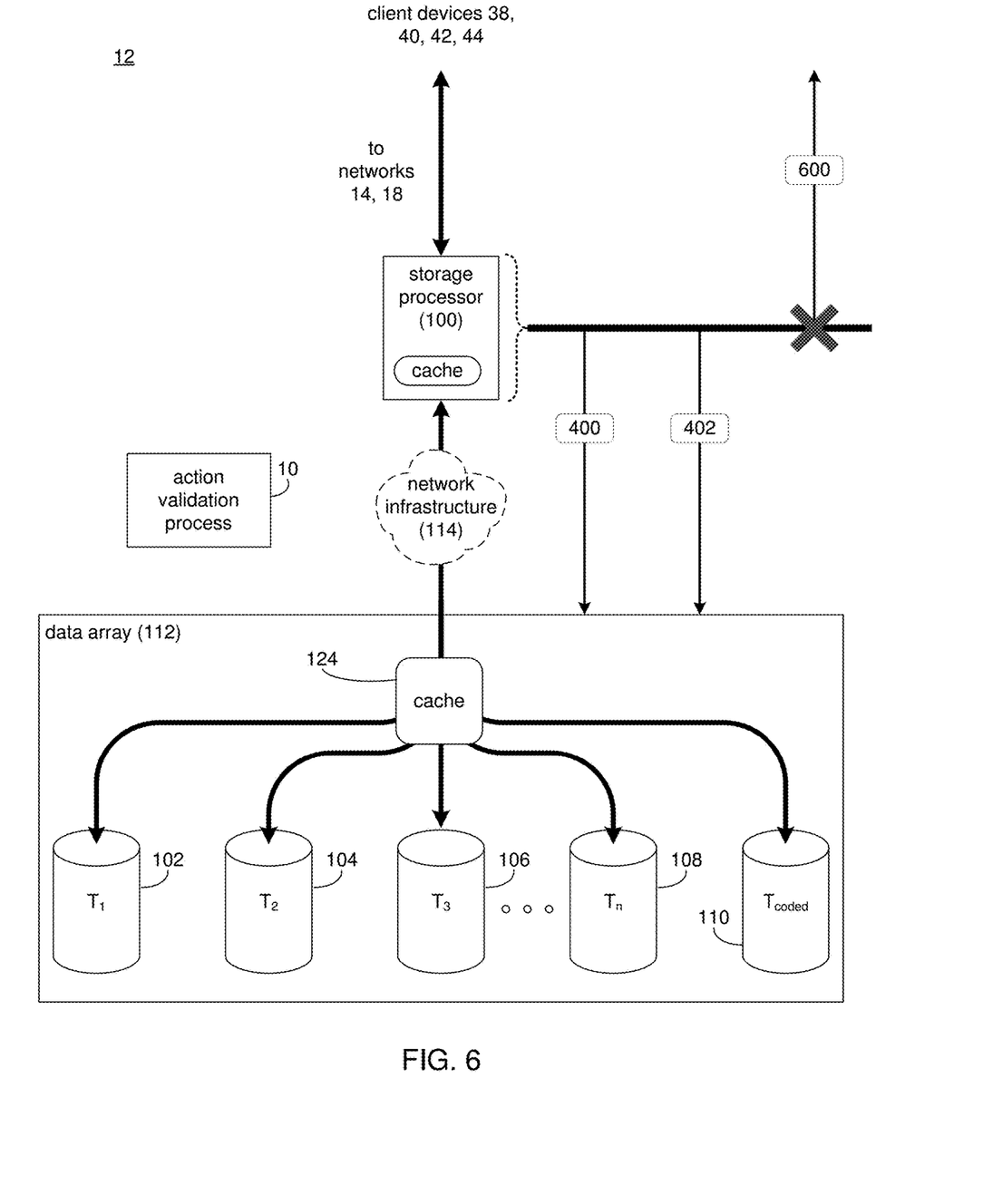
FIG. 6 is an example diagrammatic view of the storage system of FIG. 1 according to one or more example implementations of the disclosure Like reference symbols in the various drawings indicate like elements.

In some implementations, action validation process 10 may, in response to determining that the action is valid, perform 304 the action on the object. Referring also to FIG. 6 and continuing with the above examples, suppose action validation process 10 determines 302 that the actions of request 400 and request 402 are valid while the action of request 404 is invalid. In this example, action validation process 10 may, in response to determining that the actions of request 400 and request 402 are valid, perform 304 the action on the objects specified by each request.

In some implementations, action validation process 10 may, in response to determining that the action is invalid, generate 306 one or more errors based upon, at least in part, the one or more parameters of the validation annotation associated with the one or more conditions. Referring again to FIG. 6 and continuing with the above examples, suppose that action validation process 10 determines 302 that the volume creation of request 404 is invalid for performing on the storage system. In this example and as shown in FIG. 5C, action validation process 10 may generate one or more errors or error codes based upon, at least in part, parameters 512 of validation annotation 500. For example, action validation process 10 may generate 306 an error code indicating that the volume name length is exceeded with the volume name specified in request 404. While an example has been provided of a single error or error code that may be generated for a particular invalid action, it will be appreciated that any number of errors or error codes may be generated within the scope of the present disclosure.

In some implementations, generating 306 the one or more errors based upon, at least in part, the one or more parameters of the validation annotation associated with the one or more conditions may include generating 310 an error for each condition for which the action is not valid based upon, at least in part, the one or more parameters of the validation annotation associated with the one or more conditions. For example, suppose that when determining whether or not the volume creation action of request 404 is valid for performing on the storage system, action validation process 10 determines that the action of request 404 is invalid for a plurality of conditions. In this example, action validation process 10 may generate 306 an error for each condition for which the action is not valid based upon, at least in part, the parameters of the validation annotation defined for the plurality of conditions. In some implementations, action validation process 10 may generate 306 a list of errors (e.g., list of errors 600) that can be returned to represent all failed validations.

In some implementations, generating 306 the one or more errors based upon, at least in part, the one or more parameters of the validation annotation associated with the one or more conditions may include providing 312 each error to a requesting computing device. Continuing with the above example and as shown in FIG. 6, action validation process 10 may provide 312 a list of errors or error codes (e.g., list of errors 600) to the requesting computing device(s) (e.g., client electronic devices 38, 40, 42, 44). In this manner and instead of the conventional approach of returning the first occurring error in a potential sequence of error codes, action validation process 10 may provide 312 a complete list of errors or error codes to the requesting computing device. Accordingly, a user of the requesting computing device may modify the requested actions to address each of the errors provided 312 by action validation process 10.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   receiving a request to perform an action on an object within a storage system;
   determining, within a single validation state, whether the action is valid for performing on the object based upon, at least in part, one or more conditions associated with performing the action and one or more parameters of a common validation annotation associated with the one or more conditions; and
   in response to determining that the action is valid, performing the action on the object and evaluating the one or more conditions associated with the action and the one or more conditions annotated with the common validation annotation, and
   in response to determining that the action is invalid, generating one or more errors based upon, at least in part, the one or more parameters of the common validation annotation associated with the one or more conditions.

2. The computer-implemented method of claim 1, wherein the one or more parameters of the common validation annotation define one or more errors associated with the plurality of conditions.

3. The computer-implemented method of claim 1, wherein generating one or more errors based upon, at least in part, the one or more parameters of the common validation annotation associated with the one or more conditions includes:
   generating an error for each condition for which the action is not valid based upon, at least in part, the one or more parameters of the common validation annotation associated with the one or more conditions; and
   providing each error to a requesting computing device.

4. The computer-implemented method of claim 1, wherein the one or more parameters of the common validation annotation define one or more actions that bypass at least one condition of the one or more conditions.

5. The computer-implemented method of claim 1, wherein the one or more parameters of the common validation annotation define an exclusive list of actions that are valid for performing on the object.

6. The computer-implemented method of claim 1, wherein the one or more parameters of the common validation annotation define one or more errors configured to be overridden.

7. The computer-implemented method of claim 6, further comprising:
   receiving an override flag associated with the one or more errors configured to be overridden, in the request to perform the action on the object.

8. A computer program product residing on a non-transitory computer readable medium having a plurality of instructions stored thereon which, when executed by a processor, cause the processor to perform operations comprising:
   receiving a request to perform an action on an object within a storage system;
   determining, within a single validation state, whether the action is valid for performing on the object based upon, at least in part, one or more conditions associated with performing the action and one or more parameters of a common validation annotation associated with the one or more conditions; and in response to determining that the action is valid, performing the action on the object and evaluating the one or more conditions associated with the action and the one or more conditions annotated with the common validation annotation, and in response to determining that the action is invalid, generating one or more errors based upon, at least in part, the one or more parameters of the common validation annotation associated with the one or more conditions.

9. The computer program product of claim 8, wherein the one or more parameters of the common validation annotation define one or more errors associated with the plurality of conditions.

10. The computer program product of claim 9, wherein generating one or more errors based upon, at least in part, the one or more parameters of the common validation annotation associated with the one or more conditions includes:

generating an error for each condition for which the action is not valid based upon, at least in part, the one or more parameters of the common validation annotation associated with the one or more conditions; and providing each error to a requesting computing device.

11. The computer program product of claim 8, wherein the one or more parameters of the common validation annotation define one or more actions that bypass at least one condition of the one or more conditions.

12. The computer program product of claim 8, wherein the one or more parameters of the common validation annotation define an exclusive list of actions that are valid for performing on the object.

13. The computer program product of claim 8, wherein the one or more parameters of the common validation annotation define one or more errors configured to be overridden.

14. The computer program product of claim 8, wherein the operations further comprise:

receiving an override flag associated with the one or more errors configured to be overridden, in the request to perform the action on the object.

15. A computing system comprising:

a memory; and a processor configured to receive a request to perform an action on an object within a storage system, wherein the processor is further configured to determine, within a single validation state, whether the action is valid for performing on the object based upon, at least in part, a plurality of conditions associated with performing the action and a plurality of parameters of a common validation annotation associated with the plurality of conditions, wherein the processor is further configured to, in response to determining that the action is valid, performing the action on the object and evaluating the plurality of conditions associated with the action and the plurality of conditions annotated with the common validation annotation, and wherein the processor is further configured to, in response to determining that the action is invalid, generate one or more errors based upon, at least in part, the plurality of parameters of the common validation annotation associated with the plurality of conditions.

16. The computing system of claim 15, wherein the plurality of parameters of the common validation annotation define one or more errors associated with the plurality of conditions.

17. The computing system of claim 16, wherein generating one or more errors based upon, at least in part, the plurality of parameters of the common validation annotation associated with the plurality of conditions includes:

generating an error for each condition for which the action is not valid based upon, at least in part, the plurality of parameters of the common validation annotation associated with the plurality of conditions; and providing each error to a requesting computing device.

18. The computing system of claim 15, wherein the plurality of parameters of the common validation annotation define one or more actions that bypass at least one condition of the plurality of conditions.

19. The computing system of claim 15, wherein the plurality of parameters of the common validation annotation define an exclusive list of actions that are valid for performing on the object.

20. The computing system of claim 15, wherein the plurality of parameters of the common validation annotation define one or more errors configured to be overridden.

* * * * *